United States Patent
Kim et al.

(10) Patent No.: US 9,288,013 B2
(45) Date of Patent: Mar. 15, 2016

(54) METHOD AND APPARATUS FOR TRANSCEIVING AN UPLINK HARQ IN A WIRELESS COMMUNICATION SYSTEM

(75) Inventors: Hyungtae Kim, Anyang-si (KR); Hanbyul Seo, Anyang-si (KR); Kijun Kim, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/130,859

(22) PCT Filed: Jul. 6, 2012

(86) PCT No.: PCT/KR2012/005372
§ 371 (c)(1),
(2), (4) Date: Jan. 3, 2014

(87) PCT Pub. No.: WO2013/006010
PCT Pub. Date: Jan. 10, 2013

(65) Prior Publication Data
US 2014/0140273 A1    May 22, 2014

Related U.S. Application Data

(60) Provisional application No. 61/504,712, filed on Jul. 6, 2011.

(51) Int. Cl.
H04W 4/00 (2009.01)
H04L 1/18 (2006.01)

(52) U.S. Cl.
CPC ............ *H04L 1/1825* (2013.01); *H04L 1/1812* (2013.01); *H04L 1/1822* (2013.01)

(58) Field of Classification Search
USPC ......... 370/328, 329, 338, 312, 331, 315, 351, 370/336; 714/748
See application file for complete search history.

(56) References Cited

U.S. PATENT DOCUMENTS

2010/0169732 A1   7/2010   Wu
2011/0310830 A1*  12/2011  Wu et al. ................ 370/329

FOREIGN PATENT DOCUMENTS

WO   2011008049   1/2011
WO   2011020922   2/2011

OTHER PUBLICATIONS

LTE, "Evolved Universal Terrestrial Radio Access (E-UTRA); Medium Access Control (MAC) protocol specification (3GPP TS 36.321 version 8.2.0 Release 8)", ETSI TS 136 321 V8.2.0, Nov. 2008, 35 pages (relevant pp. 18-19).
PCT International Application No. PCT/KR2012/005372, Written Opinion of the International Searching Authority dated Jan. 21, 2013, 16 pages.

* cited by examiner

*Primary Examiner* — Chi H Pham
*Assistant Examiner* — Alexander O Boakye
(74) *Attorney, Agent, or Firm* — Lee, Hong, Degerman, Kang & Waimey

(57) ABSTRACT

The present invention relates to a wireless communication system, and more particularly, to a method and apparatus for transceiving an uplink hybrid automatic repeat request (HARQ). According to one embodiment of the present invention, a method for performing a HARQ operation in a terminal of a wireless communication system comprises the steps of: receiving, in a subframe n, an uplink grant message for first uplink data from a base station; determining a first HARQ process from among a plurality of HARQ processes associated with the subframe n; and transmitting, in a subframe n+k, the first uplink data to the base station through the first HARQ process.

11 Claims, 15 Drawing Sheets

FIG. 5
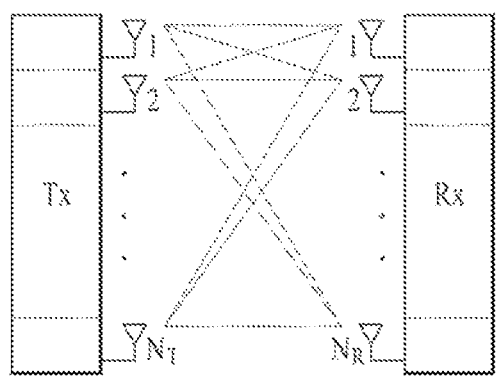
(a)
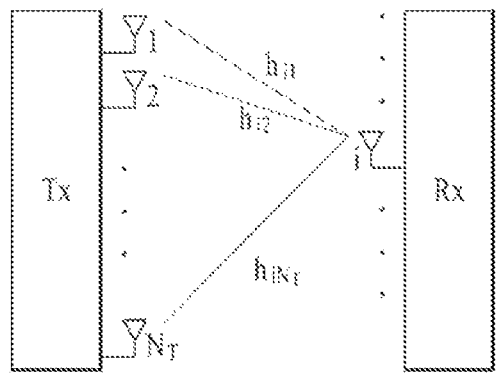
(b)

FIG. 8
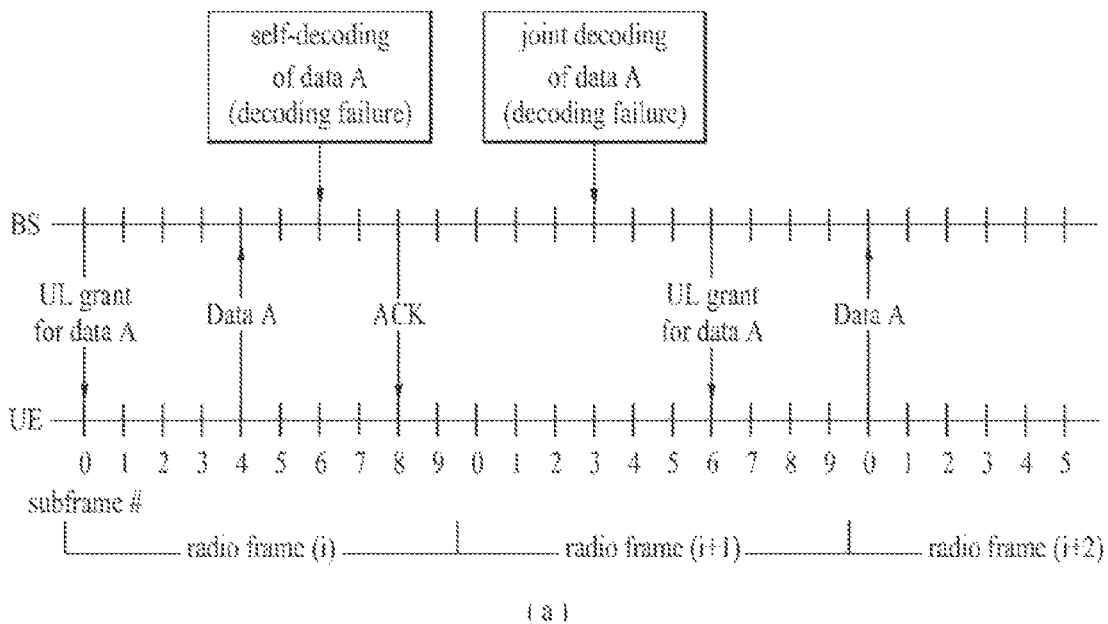
(a)
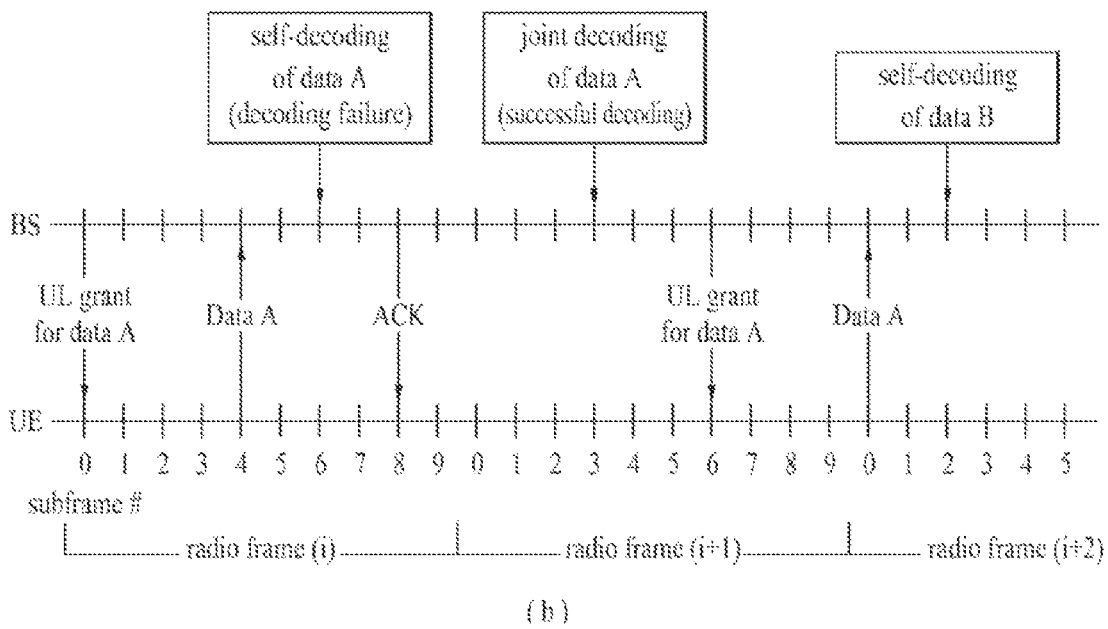
(b)

METHOD AND APPARATUS FOR TRANSCEIVING AN UPLINK HARQ IN A WIRELESS COMMUNICATION SYSTEM

CROSS-REFERENCE TO RELATED APPLICATIONS

This application is a National Stage filing under 35 U.S.C. 371 of International Application No. PCT/KR2012/005372, filed on Jul. 6, 2012, which claims the benefit of U.S. Provisional Application Ser. No. 61/504,712, Filed Jul. 6, 2011, the contents of which are hereby incorporated by reference herein in their entirety.

FIELD OF THE INVENTION

The present invention relates to a wireless communication system, and more particularly to a method and apparatus for transmitting and receiving an uplink hybrid automatic repeat request (UL HARQ).

BACKGROUND ART

A hybrid automatic repeat request (HARQ) operation can be applied as a method for controlling data reception failure. When a data transmitter receives an ACK signal from a data receiver after transmitting a packet to the data receiver, the data transmitter can transmit a new packet. If the data transmitter receives a NACK signal from the data receiver, the data transmitter can retransmit the previously transmitted packet. In this case, a packet to which encoding according to forward error correction (FEC) has been applied can be retransmitted. Accordingly, the data receiver decodes a received packet and transmits an ACK signal upon successfully decoding the received packet. When the data receiver does not successfully decode the received packet, the data receiver transmits a NACK signal and stores the received packet in a buffer. Upon reception of a retransmitted packet according to the NACK signal, the data receiver combines the retransmitted packet with the packet stored in the buffer and decodes the combined packet to improve packet reception success rate.

In accordance with a synchronous HARQ operation of the conventional wireless communication system, 8 independent HARQ processes are defined. In addition, one HARQ process is associated with one transmission (Tx) time, and each HARQ process is defined to have a time period of 8 msec. For example, assuming that initial transmission of UL data is performed at a subframe n through a HARQ process #1, if the corresponding UL data is retransmitted at a subframe n+8, retransmission of the UL Data is performed at the same HARQ process #1.

DETAILED DESCRIPTION OF THE INVENTION

Technical Problem

In order to improve system performance of an evolved wireless communication, a method for enabling a plurality of base stations (BSs or eNBs) to simultaneously receive UL data from a user equipment (UE), combine the received data, and decode the combined data, and a method for enabling a user equipment (UE) to transmit a plurality of codewords using multiple input multiple output (MIMO) transmission have been discussed. In this case, if the legacy HARQ operation is applied to the present invention without change, there may arise some problems, for example, reduction of a transfer rate, data loss, etc.

An object of the present invention is to provide a method for efficiently and correctly performing the HARQ operation using multiple HARQ processes associated with one transmission (Tx) point.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing a hybrid automatic repeat request (HARQ) operation by a user equipment (UE) in a wireless communication system including: receiving an uplink (UL) grant message for first UL data from a base station (BS) at a subframe n; determining a first HARQ process from among a plurality of HARQ processes associated with the subframe n; and transmitting the first UL data to the base station (BS) through the first HARQ process at a subframe n+k.

In another aspect of the present invention, a user equipment (UE) for performing a hybrid automatic repeat request (HARQ) operation in a wireless communication system includes: a transmission (Tx) module configured to transmit an uplink signal to a base station (BS); a reception (Rx) module configured to receive a downlink signal from the base station (BS); and a processor configured to control the UE including the transmission (Tx) module and the reception (Rx) module, wherein the processor receives an uplink (UL) grant message for first UL data from the base station (BS) at a subframe n using the reception (Rx) module, determines a first HARQ process from among a plurality of HARQ processes associated with the subframe n, and transmits the first UL data to the base station (BS) through the first HARQ process at a subframe n+k using the transmission (Tx) module.

The following description may be commonly applied to the embodiments of the present invention.

The method may further include: receiving a UL grant message for second UL data at the subframe n+2k*m where m is one of natural numbers; and determining one HARQ process from among a plurality of HARQ processes associated with the subframe n+2k*m.

The method may further include: if the determined one HARQ process is the first HARQ process, transmitting the second UL data to the BS through the first HARQ process at a subframe n+2k*m+k.

The first UL data may be flushed from a buffer of the first HARQ process, and the second UL data may be maintained.

The method may further include: if the determined one HARQ process is a second HARQ process, transmitting the second UL data to the BS through the second HARQ process at a subframe n+2k*m+k.

The first UL data may be maintained in a buffer of the first HARQ process, and the second UL data may be maintained in a buffer of the second HARQ process.

The plurality of HARQ processes associated with the subframe n may be identical to a plurality of HARQ processes associated with the subframe n+2k*m.

A HARQ ACK/NACK response for UL data transmitted at one subframe may be received at the one subframe+k*d where 'd' is one of natural numbers corresponding to odd numbers.

The determining may be performed on the basis of HARQ process indication information contained in the UL grant message.

The HARQ process indication information may be 1-bit information for indicating one of two HARQ processes associated with one subframe.

'k' may be set to 4.

It is to be understood that both the foregoing general description and the following detailed description of the present invention are exemplary and explanatory and are intended to provide further explanation of the invention as claimed.

Effects of the Invention

As is apparent from the above description, the embodiments of the present invention can provide a method for efficiently and correctly performing the HARQ operation using multiple HARQ processes associated with one transmission (Tx) time.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating a wireless communication system including multiple antennas.

FIG. 8 is a conceptual diagram illustrating a method for enabling a base station (BS) configured to perform the CoMP JR operation to transmit an ACK message irrespective of the self-decoding result.

BEST MODE FOR CARRYING OUT THE INVENTION

Figure 1:
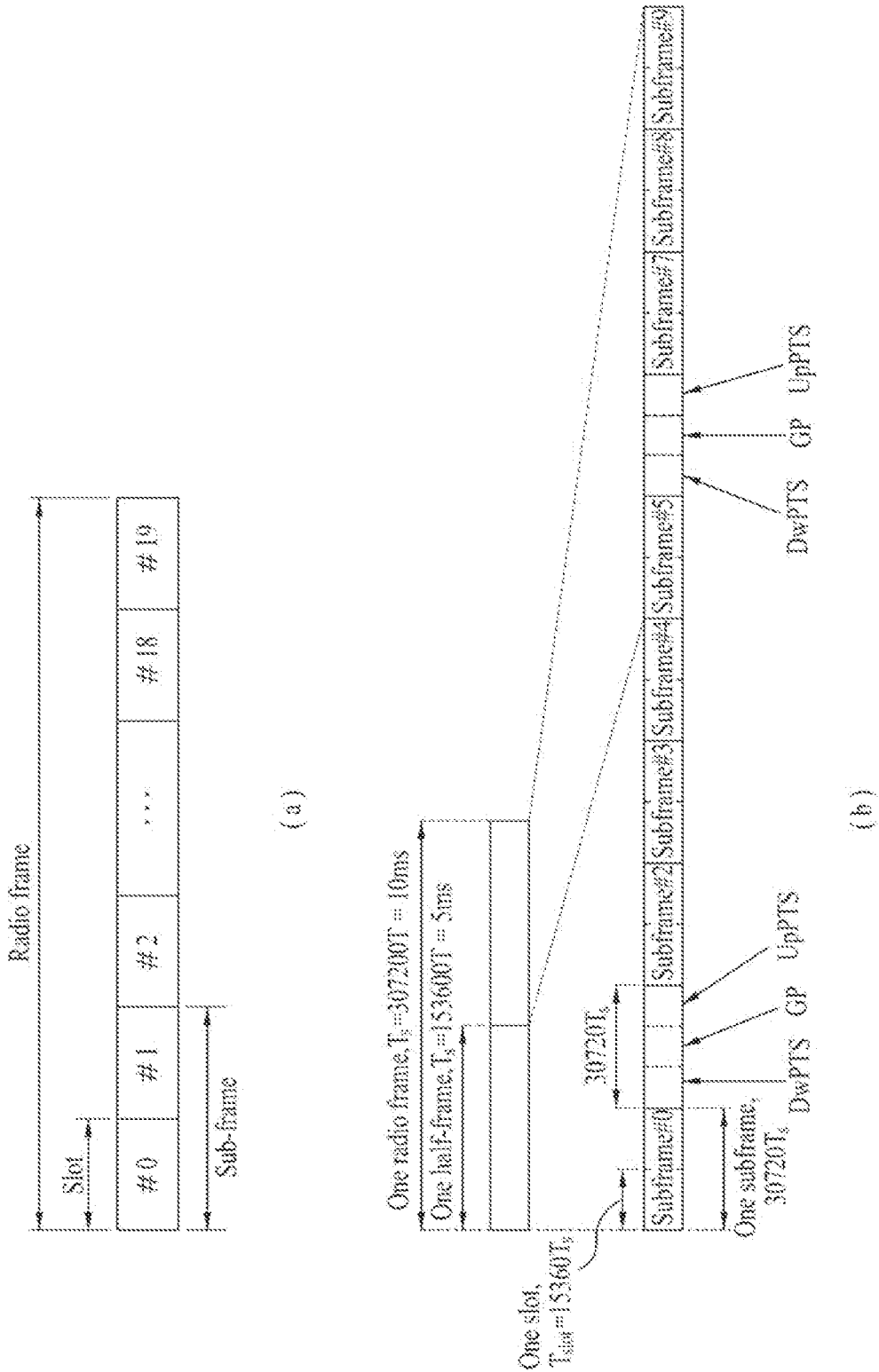
FIG. 1 exemplarily shows a radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
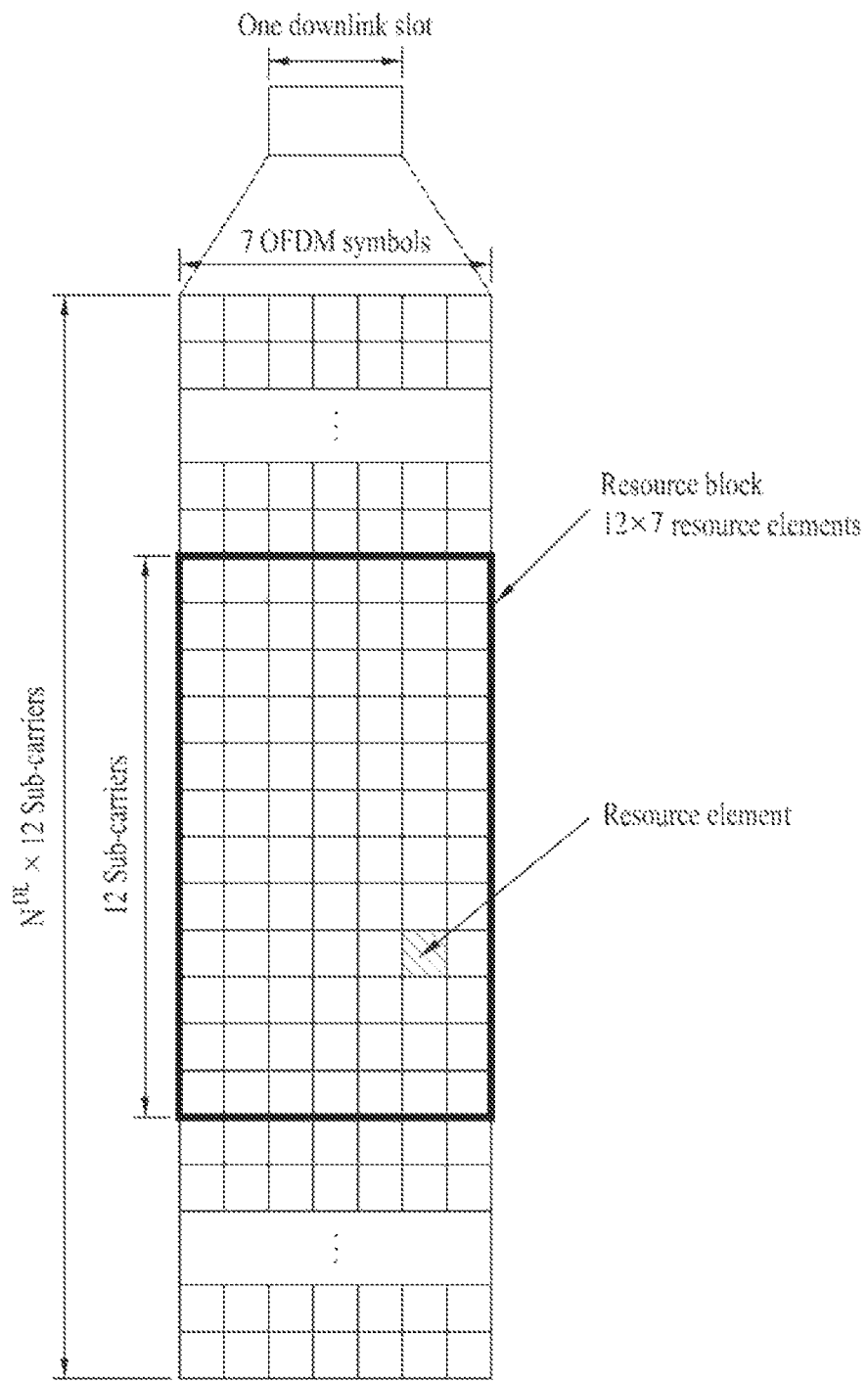
FIG. 2 exemplarily shows a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
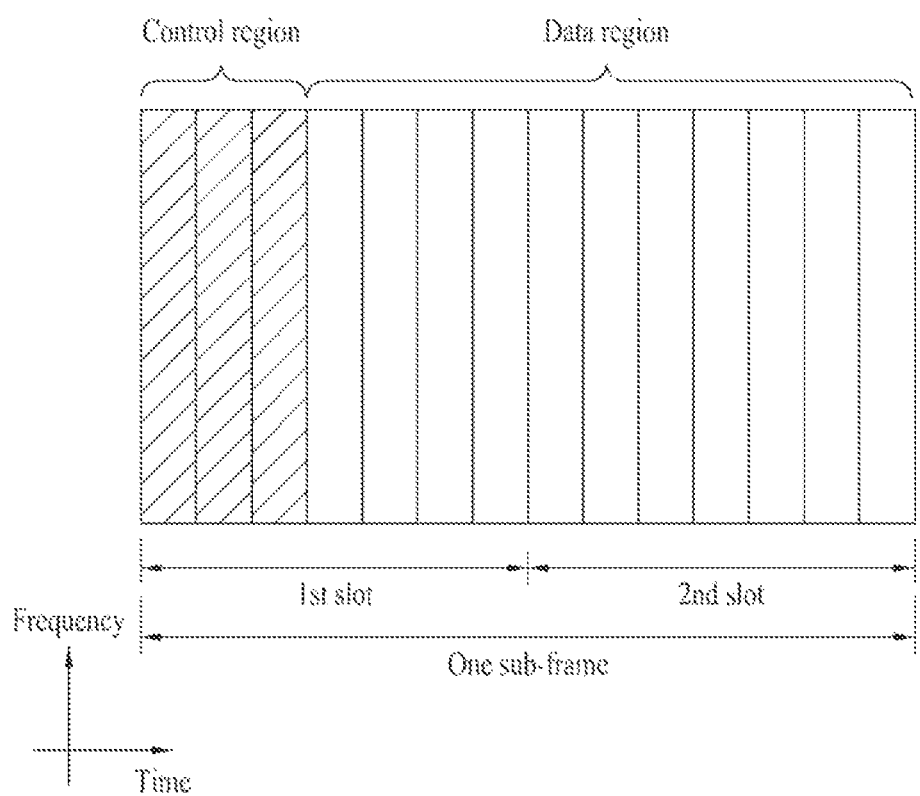
FIG. 3 exemplarily shows a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
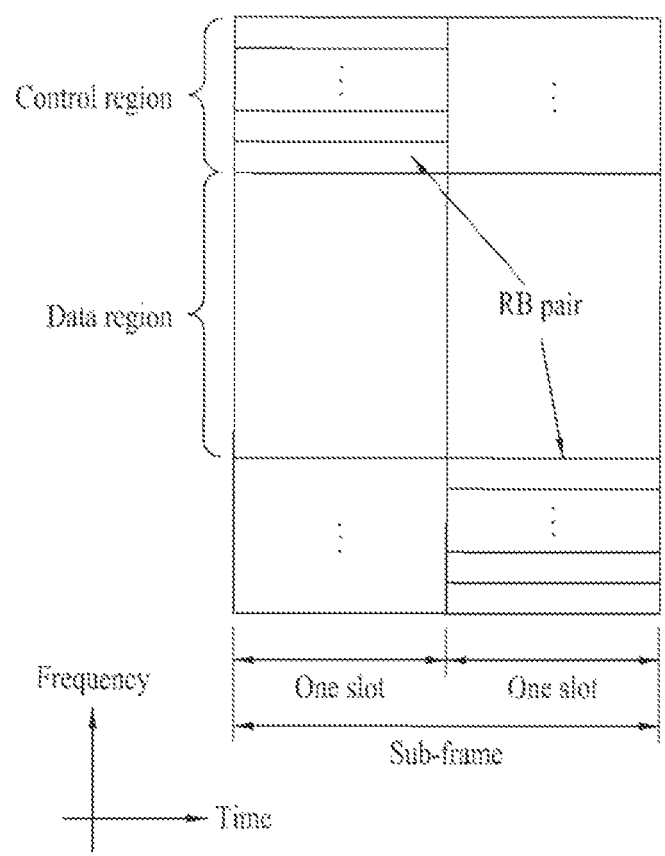
FIG. 4 exemplarily shows an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate Ro that may be achieved with a single antenna, the transmission rate may be increased, in theory, to the product of Ro and a transmission rate increase rate R, illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \quad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T$$ [Equation 9]

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R)$$ [Equation 11]

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Automatic Repeat reQuest (ARQ)

A BS or eNB (cell or sector) for use in a mobile communication system may wirelessly communicate with a plurality of UEs. In case of DL Tx/Rx, the BS may transmit data received from a network to each UE using a predetermined communication scheme. DL scheduling (or DL assignment) may indicate which UE will receive data from the BS through certain resources (corresponding to any one of time, frequency, and spatial resources) to be used by the BS. In case of UL Tx/Rx, the BS may receive and demodulate data transmitted from the UE using a predetermined communication scheme, and then transmit the demodulated result to the network. UL scheduling (or UL grant) may indicate which UE will receive UL data from the BS using certain resources (corresponding to any one of time, frequency, and spatial resources). Generally, a UE having a good channel condition may be scheduled to perform data communication using much more time and frequency resources.

In case of UL/DL data transmission/reception, unexpected errors may occur in Tx data according to a channel environment or the like. As an exemplary error correction method, the ARQ scheme or an evolved HARQ scheme may be used. In accordance with the ARQ scheme, the transmitter transmits data of one unit and then awaits reception of an ACK or NACK message in response to the transmitted data. If the data has been correctly decoded, the receiver feeds back the ACK message to the transmission end. If there arises any error in the data, the receiver may feed back the NACK message to the transmitter, and erroneous data is then deleted from a buffer of the receiver. Upon receiving the ACK message from the transmitter, the receiver transmits new data. Upon receiving the NACK message from the transmitter, the receiver may retransmit previous data. In accordance with the HARQ scheme, if data received by the receiver has been wrongly decoded, the receiver may feed back the NACK message to the transmitter, store legacy reception data (i.e., incorrectly decoded data) in the buffer during a predetermined time, and combine the stored data with data retransmitted by the transmitter, such that the receiver may reattempt to decode the resultant reception data. As a result, a reception success rate can be increased using the HARQ scheme.

The HARQ scheme may be classified into a synchronous scheme and an asynchronous scheme on the basis of a retransmission time, and may also be classified into an adaptive scheme and a non-adaptive scheme according to whether a changed channel state is applied to the amount of resources used for retransmission.

In accordance with the synchronous HARQ scheme, if initial transmission failure occurs, subsequent retransmission may be carried out at a specific time decided by the system. For example, assuming that retransmission is scheduled at intervals of n (e.g., n=4) time units (e.g., n subframes) upon completion of the initial transmission failure, the transmitter need not inform the receiver of information regarding the retransmission time. Accordingly, upon receiving the NACK signal from the data transmitter, the receiver may retransmit a packet at every n-th time unit before receiving the ACK signal. On the contrary, according to the asynchronous HARQ scheme, information regarding the retransmission time may be scheduled separately. Therefore, the retransmission time of the packet corresponding to the NACK signal may be changed by various conditions such as channel state, etc.

In accordance with the non-adaptive HARQ scheme, the modulation and coding scheme (MCS) level of the retransmitted packet, the number of used resource blocks (RBs), and the like, may be achieved as defined in initial transmission. For example, assuming that the transmitter transmits data using 8 resource blocks (RBs) during initial transmission, the 8 RBs may also be retransmitted during retransmission. In the meantime, the adaptive scheme may change the packet modulation scheme and the number of RBs according to channel state. For example, even when data is transmitted using 8 RBs, the data may be retransmitted using fewer or more than 8 RBs.

Although four HARQ schemes may be defined according to the aforementioned classification, the asynchronous and channel adaptive HARQ scheme and the synchronous channel non-adaptive HARQ scheme are mainly used. The asynchronous and channel adaptive HARQ scheme may adaptively change a retransmission time and the amount of resources used according to channel state, such that retransmission efficiency can be maximized but overhead unavoidably increases. Meanwhile, according to the synchronous and channel non-adaptive HARQ scheme, the retransmission time and resource assignment have been promised in the system, such that there is little overhead requisite for the retransmission time and resource assignment. However, if the synchronous and channel non-adaptive HARQ scheme is used in a highly variable channel, retransmission efficiency is decreased.

Figure 6:
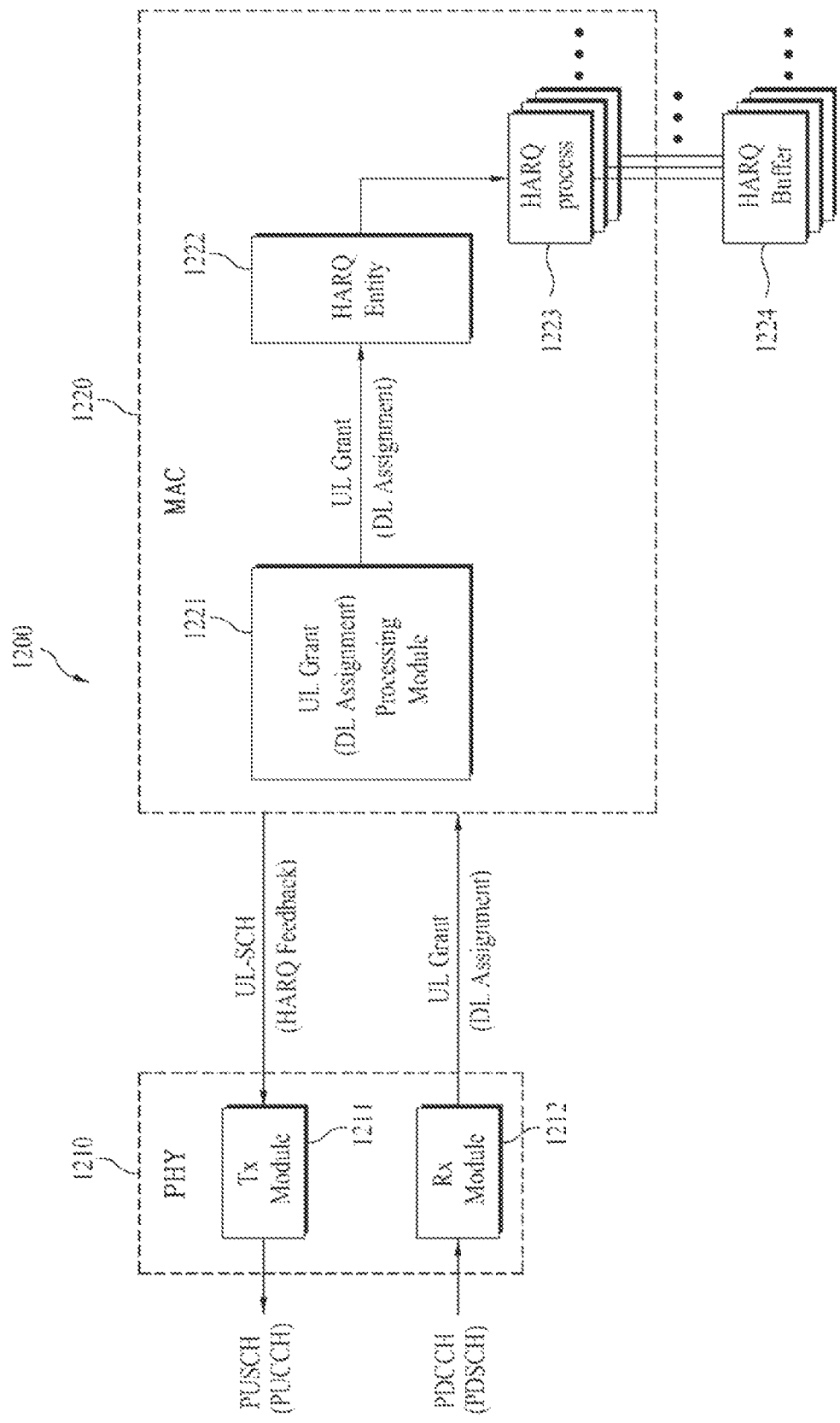
FIG. 6 is a block diagram illustrating a user equipment (UE) applicable to embodiments of the present invention.

FIG. 6 is a block diagram of a UE device according to an embodiment of the present invention. The UE device may include an antenna (not shown) for transmission and reception of signals, a memory (not shown) for storing data and information, and a processor 1200 for processing transmitted and received signals. FIG. 6 shows the internal configuration of the processor 1200 for processing Tx/Rx signals and UE operations.

The processor 1200 may be divided into a physical layer module 1210 for transmitting/receiving physical signals to/from an eNB and a MAC layer module 1220 for connecting the physical layer module 1210 to a higher layer (not shown) and controlling signal transmission and reception of the physical layer module 1210.

Specifically, the physical layer module 1210 may include a transmission module 1211 for transmitting a UL signal to the eNB and a reception module 1212 for receiving a signal from the eNB. The MAC layer module 1220 may include a processing module 1221 for processing a UL grant signal and DL assignment signal, a HARQ entity 1222 for managing a HARQ operation, and a plurality of HARQ processes 1223. One HARQ entity 1222 may be assigned a plurality of parallel HARQ processes 1223. A HARQ process ID is given per HARQ process 1223. The plurality of HARQ processes 1223 may include HARQ buffers 1224 respectively corresponding thereto. If the MAC layer module 1220 is designed to execute functions of the UL grant processing module/DL assignment processing module 1221 shown in FIG. 6, it is not necessary to configure the UL grant processing module/DL assignment processing module 1221 as a separate module.

In UL HARQ operations, the UE has a buffer capable of storing Tx data, but this buffer may be managed in different ways according to control signals from the BS or eNB. If the UE receives a UL grant signal, previous Tx data is flushed from the buffer, and the buffer is filled with new data to be transmitted according to a UL grant. If the UE receives a NACK signal from the BS in response to previous Tx data, the previous Tx data should be retransmitted, such that data stored in the buffer remains unchanged. Even when the UE receives the ACK signal from the BS in response to the previous Tx data, the data stored in the buffer remains unchanged. As a result, although the UE does not receive the NACK signal from the BS or the UE mistakes the NACK signal for the ACK signal due to a decoding error, data stored in the buffer is prohibited from being flushed.

In addition, detailed structures of other transceivers (e.g., a relay device, a BS (or eNB) device, etc.) configured to perform the HARQ operation may be substantially identical to the processor 1200 of FIG. 6. The overall configuration of the processors of the UE or the transceiver may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Figure 7:
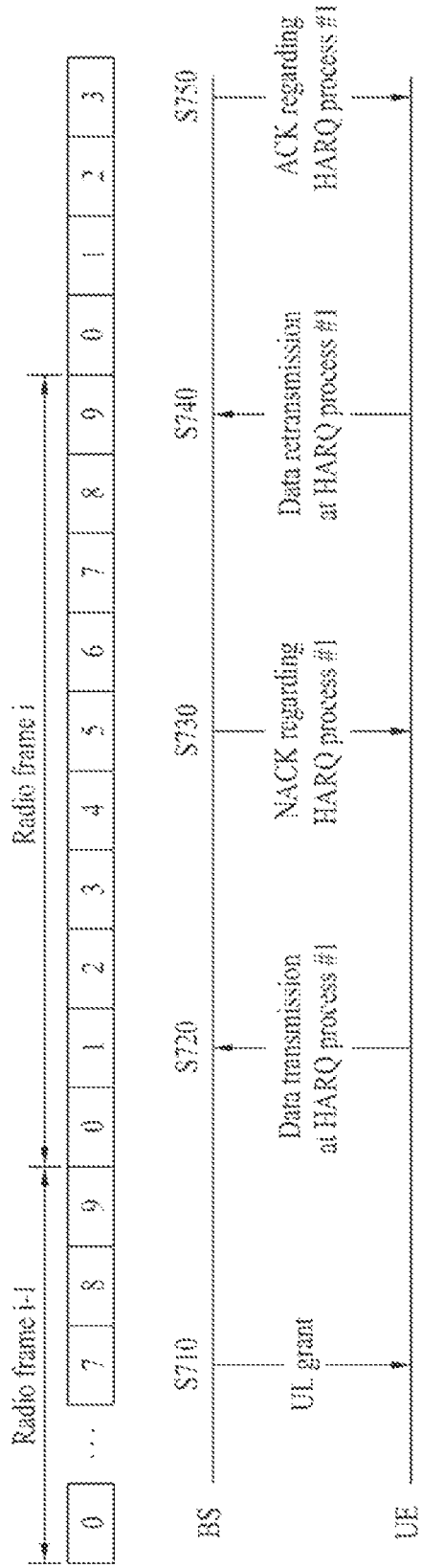
FIG. 7 is a conceptual diagram illustrating an exemplary synchronous non-adaptive UL HARQ operation.

FIG. 7 is a conceptual diagram illustrating an exemplary synchronous non-adaptive UL HARQ operation.

Referring to FIG. 7, a user equipment (UE) has a plurality of HARQ processes, and the HARQ processes may operate in a synchronous manner. That is, each HARQ process may be allocated to each TTI in a synchronous manner. For example, the LTE system assumes that the UE has 8 HARQ processes. As a result, HARQ process #1 may be allocated to the first TTI, HARQ process #2 may be allocated to the second TTI, . . . HARQ process #8 may be allocated to the 8$^{th}$ TTI, HARQ process #1 may be allocated to a 9th TTI, and HARQ process #2 may be allocated to the 10$^{th}$ TTI. For example, if a PDCCH including a UL grant is detected at a specific TTI, the HARQ entity can identify the HARQ process in which data transmission should be carried out, and can transfer UL grant information to the identified HARQ process. For example, as can be seen from FIG. 7, if the HARQ process associated with Subframe #7 of a radio frame (i−1) having received the UL grant is set to 1, UL data may be transmitted at HARQ process #1 at Subframe #1 of the radio frame (i) and may be retransmitted at HARQ process #1 at Subframe #9 of the radio frame (i) after lapse of 8 subframes. In a synchronous HARQ operation, if the HARQ process associated with one TTI is identified, it can be recognized that the same HARQ process is associated at the corresponding TTI (TTI+8). If a certain HARQ process is associated with one TTI during the synchronous HARQ operation unless otherwise mentioned, it is assumed that the same HARQ process is associated with the 8$^{th}$, 16$^{th}$, and 24$^{th}$ TTIs after lapse of the corresponding TTI.

In step S710, the BS (or eNB) may transmit a UL grant to the UE, such that the UE may flush a Tx buffer and store new UL data in the Tx buffer. In step S720, the UE may transmit UL data to the BS (or eNB) at HARQ process #1 on the basis of resources and MCS information in response to the UL grant received at step S710. In this example, it is assumed that UL data received by the BS (or eNB) fails to be decoded, such that the BS (or eNB) may transmit the NACK message in response to UL data in step S730. Upon receiving the NACK message from the BS (or eNB), the UE may retransmit the previously transmitted UL data in step S740. In this case, retransmission may be carried out at HARQ process #1 in which UL data transmission has been carried out at step S720, and the retransmission may be carried out at intervals of 8 msec. That is, a time point at which retransmission is carried out is not separately designated, and the retransmission is carried out at intervals of a predetermined time, such that this operation may correspond to a synchronous HARQ operation. In addition, the UE having received the NACK message may apply resources, MCS level, etc. designated by the previously received UL grant to retransmission without change, without receiving a separated UL grant. That is, new scheduling information for retransmission is not given, and may correspond to the non-adaptive HARQ operation. The BS having received the retransmitted UL data combines the retransmitted UL data with the previously received data, and attempts to decode the combined result. In this example, it is assumed that the BS succeeds in reception and decoding of UL data. In this case, the BS may transmit the ACK message to the UE in step S750. Although FIG. 7 assumes an uplink (UL) situation in which the UE is a data transmitter, the BS is a data receiver, and the UE receives HARQ feedback information from the UE for convenience of description and better understanding of the present invention, the HARQ operation may be carried out even in the case in which the BS transmits DL data and the UE feeds back ACK/NACK information.

Multiple HARQ Processes

The present invention proposes a method for achieving a high data transfer rate using multiple HARQ processes. In accordance with multiple HARQ processes proposed by the present invention, one HARQ process is not associated with one TTI in the same manner as in the conventional scheme, and two or more HARQ processes are associated with one TTI. For example, a double HARQ process may include a subprocess A and a subprocess B contained in one legacy HARQ process. That is, one HARQ process i (where 1≤i≤8) may include a HARQ subprocess (i-A) and a HARQ process (i-B). In addition, a distinctive transmission buffer may be allocated to each subprocess. Multiple HARQ processes proposed by the present invention can be distinguished from the legacy HARQ processes, and detailed examples thereof will be more clearly understood from the following detailed description.

Multiple HARQ processes can prevent data loss and can correctly and efficiently perform UL transmission under either the UL CoMP environment in which it takes a long time from UL data reception to UL data decoding or various evolved transmission schemes such as UL multi-codeword transmission.

An exemplary case of CoMP JT (Joint Reception) will hereinafter be described. The UL CoMP JR scheme enables a plurality of BSs (or eNBs) to simultaneously receive UL data of one UE so as to increase a data transfer rate. For example, assuming that a serving BS and a neighbor BS of a single UE participate in JR, after two BSs (or eNBs) simultaneously receive UL data of the UE, the neighbor BS may transmit data received through a backhaul link (i.e., a link between the BSs) to the serving BS. The serving BS combines a signal directly received from the UE with a neighbor-BS signal received from the UE so as to perform joint decoding of UL data, resulting in the implementation of a higher transfer rate.

One problem of the JR scheme is that a UL synchronous HARQ process time is not satisfied under a long backhaul link delay time. In accordance with the synchronous HARQ scheme of the LTE system, the BS may transmit the ACK/NACK message or the UL grant to the UE after lapse of 4 msec from a UL data reception time. That is, the legacy LTE system (e.g., a system to which CoMP is not applied) has been designed on the assumption that the BS decodes UL data during a predetermined time of 4 msec after reception of the UL data, and can transmit ACK/NACK or UL grant according to the decoding result. However, a system to which the CoMP operation is applied encounters a backhaul link delay so that it may take more than 4 msec to decide whether a process from UL data reception to UL data decoding was successful. In this case, the HARQ operation may be incorrectly carried out.

In more detail, the serving BS of the CoMP system does not first perform JR and decodes only received UL data, such that the serving BS may be configured to perform the HARQ operation. In accordance with the embodiment of the present invention, the BS configured to perform the CoMP JR operation does not consider UL data received from another BS and perform decoding on the basis of only the received UL data. This decoding is referred to as self-decoding. In case of such self-decoding, if the serving BS succeeds in decoding UL data, the ACK message can be transmitted to the UE at a predetermined time, and the HARQ operation can be accurately carried out irrespective of a backhaul link delay.

Meanwhile, assuming that the serving BS fails to decode, the serving BS receives UL data received by the neighbor BS through a backhaul link, and performs JR. In this case, if a backhaul link delay is exemplarily set to 10 msec, the serving BS is unable to receive UL data from the neighbor BS within 4 msec from a reception time of UL data, such that the serving BS cannot perform joint decoding. After lapse of 4 msec from a specific time at which the serving BS receives UL data, one ofe ACK/NACK and UL grant will be transferred to the UE irrespective of success or failure of joint decoding. A detailed description thereof will hereinafter be described.

FIG. 8 is a conceptual diagram illustrating a method for enabling a base station (BS) configured to perform the CoMP JR operation to transmit an ACK message irrespective of the self-decoding result.

As can be seen from FIGS. 8(a) and 8(b), the BS may transmit a UL grant configured to schedule transmission of data A to a user equipment (UE) at a subframe #0 of a radio frame (i). Accordingly, the UE may perform UL transmission of data A at a subframe #4 on the basis of the UL grant. The BS having received data A does not yet receive the data A from a neighbor BS due to the occurrence of a backhaul link delay, and may attempt to perform self-decoding. In this example, it is assumed that the BS fails to self-decode the data A. Although the BS configured to perform the JR operation fails to perform self-decoding, it is assumed that the BS transmits the ACK message at a subframe #8 in consideration of a possibility that the BS succeeds in decoding data A through joint-decoding with UL data received from the neighbor BS. From the view point of the UE, since the UE receives the ACK message, the UE stops the corresponding HARQ process and maintains data stored in a transmission (Tx) buffer of the corresponding HARQ process.

FIG. 8(a) shows an exemplary case in which the BS fails to perform joint decoding with data A received from the neighbor BS. In this case, the BS may transmit the UL grant requesting retransmission of data A to the UE at a subframe #6 of a radio frame (i+1). Accordingly, the UE may retransmit data A at a subframe #0 of a radio frame (i+2).

FIG. 8(b) shows an exemplary case in which the BS fails to decode data A after completion of joint decoding. In this case, the BS may transmit a UL grant scheduling transmission of new data B to the UE at a subframe #6 of a radio frame (i+1). Accordingly, the UE may perform initial transmission of data B at a subframe #0 of a radio frame (i+2).

Referring to FIGS. 8(a) and 8(b), when the BS transmits the ACK message, the opportunity of UL transmission of the UE may be lost or damaged, irrespective of the presence or absence of errors of joint decoding. That is, as can be seen from FIG. 8(a), since the ACK message but not a NACK message is transmitted at a subframe #8 of a radio frame (i), the UE may not perform retransmission of data A at a subframe #2 of a radio frame (i+1) and retransmit data A at a subframe #0 of a radio frame (i+2) after lapse of 8 msec. On the contrary, as can be seen from FIG. 8(b), assuming that there is no backhaul link delay, the UE succeeds in joint-decoding data A in early stages, such that the UE succeeds in transmission of a UL grant of new data B at a subframe #8 of the radio frame (i) and transmits data B at a subframe #2 of the radio frame (i+1). However, in fact, data B can be transmitted at a subframe #0 of the radio frame (i+2) as can be seen from FIG. 8(b). As a result, assuming that a backhaul link delay occurs, a UL data transfer rate of the UE is also reduced.

Figure 9:
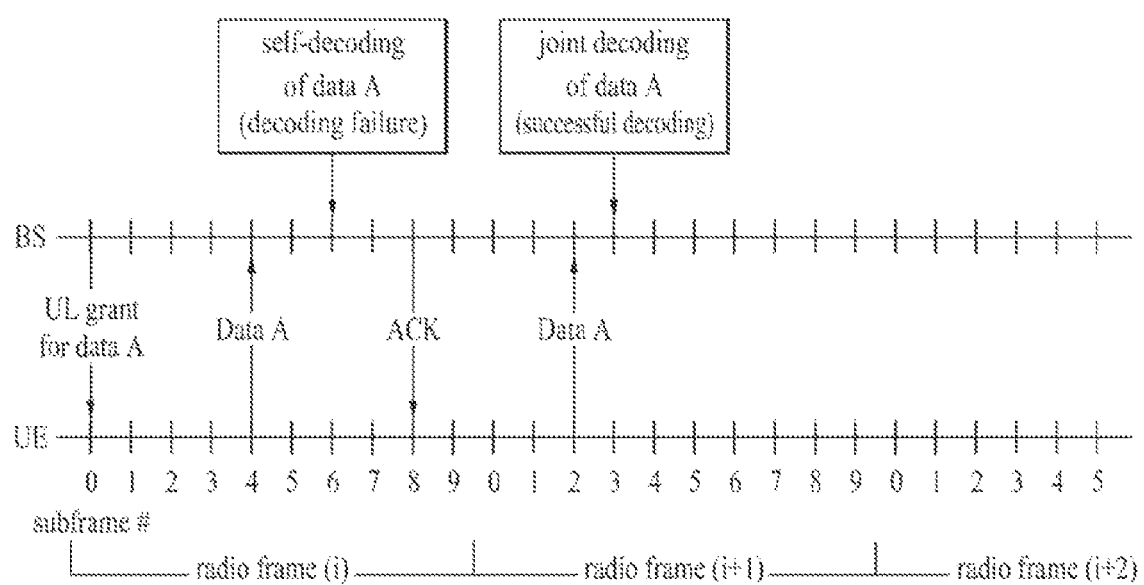
FIG. 9 is a conceptual diagram illustrating a method for enabling the BS configured to perform the CoMP JR operation to perform a NACK message irrespective of the self-decoding result.

FIG. 9 is a conceptual diagram illustrating a method for enabling the BS configured to perform the JR operation to perform NACK transmission irrespective of the self-decoding result.

Referring to FIG. 9, it is assumed that the BS transmits a UL grant of data A at a subframe #0 of the radio frame (i), the UE transmits data A, and the BS fails to perform self-decoding in the same manner as in FIG. 8. As can be seen from FIG. 9, it is assumed that the BS transmits a NACK message to the UE at a subframe #8 of the radio frame (i) irrespective of the self-decoding result. The UE having received the NACK message may retransmit data A stored in the buffer to the UE at a subframe #2 of the radio frame (i+1).

In this case, assuming that the BS fails to perform joint decoding using data A received from the neighbor BS, the BS can properly use the retransmitted data A at a subframe #2 of the radio frame (i+1). However, as can be seen from FIG. 9, assuming that the BS succeeds in joint decoding using data A received from the neighbor BS, data A retransmitted at the subframe #2 of the radio frame (i+1) is considered unnecessary retransmission and results in a waste of resources.

Figure 10:
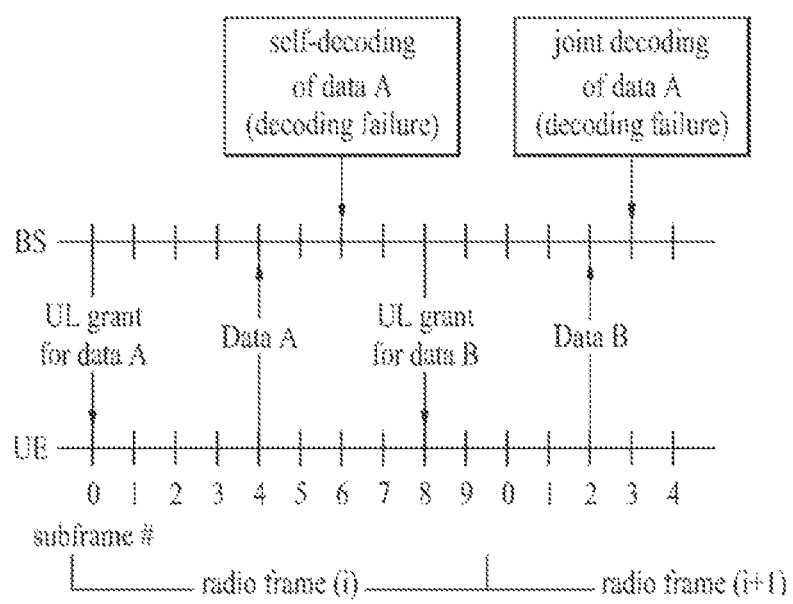
FIG. 10 is a conceptual diagram illustrating a method for enabling the BS configured to perform the CoMP JR operation to transmit a UL grant of new data irrespective of the self-decoding result.

FIG. 10 is a conceptual diagram illustrating a method for enabling the BS configured to perform the JR operation to transmit a UL grant of new data irrespective of the self-decoding result.

Referring to FIG. 10, it is assumed that the BS transmits a UL grant of data A at a subframe #0 of the radio frame (i), the UE transmits the data A, and the BS fails to perform self-decoding in the same manner as in FIG. 8. In FIG. 10, assuming that the BS succeeds in joint decoding using the data A received from the neighbor BS although it fails to perform self-decoding of the data A, the BS may transmit a UL grant of new data B to the UE at a subframe #8 of the radio frame (i). Accordingly, since the UE has received the UL grant of new data, a buffer is flushed (i.e., legacy data A is deleted from the buffer), new data B is stored in the buffer, such that the data B is initially transmitted to the BS at a subframe #2 of the radio frame (i+1).

In this case, assuming that the BS succeeds in joint decoding of data A, no problem occurs. However, if the BS fails to perform joint decoding of data A as can be seen from FIG. 10, retransmission of the data A should be indicated, however, retransmission of the data A may be impossible because the UE has already deleted the data A from the buffer. In other words, data loss occurs so that the HARQ operation cannot be accurately performed.

As previously described in FIGS. 8 to 10, assuming that a backhaul link delay is elongated during the CoMP JR operation, the serving BS should transmit an ACK/NACK or a UL grant of new data to the UE upon incompletion of joint decoding, such that reduction of a data transfer rate, a waste of resources, a data loss, etc. may occur. In this case, the multiple HARQ process operation scheme proposed by the present invention can increase system performance and can prevent a faulty operation from occurring.

FIGS. 11 to 14 are conceptual diagrams illustrating exemplary HARQ operations caused by a double HARQ process. Contents commonly applied to FIGS. 11 to 14 will hereinafter be described in detail.

FIGS. 11 to 14 are conceptual diagrams illustrating exemplary HARQ operations using a double HARQ process for use in a UL CoMP JR system. Although a time difference (n) between a data transmission and a HARQ response for use in a synchronous HARQ operation is exemplarily set to 4 msec for clarity of description, the scope of the present invention is not limited thereto and can also be applied to other examples as necessary. In the embodiments of the present invention, 8 msec is set to one period (or one interval) of the HARQ operation, such that the embodiments illustrate HARQ operations during sections 1, 2 and 3.

The BS may transmit a UL grant configured to schedule transmission of data A to the UE at a subframe #0 of the radio frame (i). Accordingly, the UE may perform UL transmission of data A at a subframe #4 on the basis of the UL grant. The BS having received data A does not yet receive the data A from the neighbor BS due to the occurrence of a backhaul link delay, and may attempt to perform self-decoding. The BS may determine whether UL data is correctly received/decoded using CRC of UL data. In this example, it is assumed that the BS fails to perform self-decoding of data A.

Under the condition that the BS does not receive data A from the neighbor BS due to a backhaul link delay or the like, the BS cannot perform joint decoding of the data A and cannot also estimate the result of joint decoding. In this case, when a HARQ response to the data A is transmitted, data loss or a waste of resources may occur as shown in FIGS. 8 to 10. Therefore, under the condition that joint decoding of the data A is not yet completed, it is more suitable to reserve a HARQ response (i.e., ACK/NACK or UL grant of data A) to a HARQ process 1-A. That is, it is more preferable that the HARQ response to the HARQ process 1-A is not transmitted at a later time instead but not an original time. Instead of the above, the BS may transmit a UL grant to a HARQ process 1-B at a subframe #8 of the radio frame (i). Accordingly, the UE may transmit data B to the BS through a HARQ process 1-B at a subframe #2 of the radio frame (i+1).

In this case, the BS operation in which the BS reserves the HARQ response to the HARQ process 1-A and transmits a UL grant to the HARQ process 1-B is not limited only to the case in which joint decoding is not completed. That is, according to the present invention, one of the HARQ processes (e.g., 2 HARQ processes) associated with one TTI is properly selected according to conditions, such that the present invention can be applied to various schemes for transmitting UL data and feeding back a HARQ response to the UL data. The examples of FIGS. 11 to 14 are merely exemplary for better understanding of the present invention, and the scope of the present invention is not limited thereto.

The examples of FIGS. 11 to 14 will hereinafter be described in detail.

Figure 11:
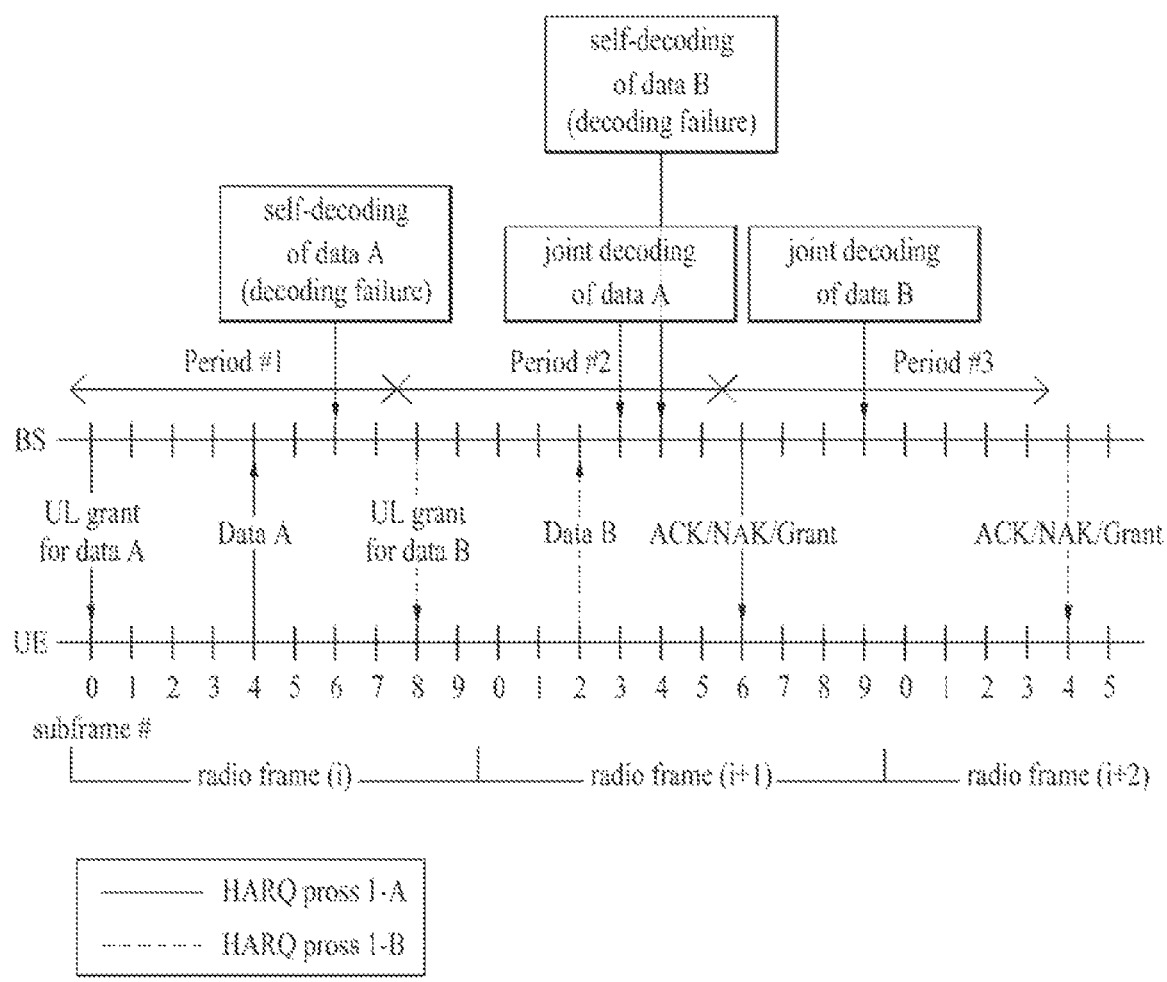
FIGS. 11 to 14 are conceptual diagrams illustrating exemplary HARQ operations caused by multiple HARQ processes.

In FIG. 11, it is assumed that the BS receives data A having been transferred from the UE to the neighbor BS during a HARQ period #2 so that the BS performs joint decoding. Meanwhile, it is also assumed that the BS performs self-decoding of data B received from the UE at a subframe #2 of the radio frame (i+1) so that a self-decoding failure occurs. In more detail, it is assumed that the BS does not receive data B from the neighbor BS during the HARQ period #2 due to a backhaul link delay, and joint decoding of the data B is not performed.

In this case, the BS may reserve a HARQ response to the HARQ process 1-B, and may transmit a HARQ response to the HARQ process 1-A at a subframe #6 of the radio frame (i+1). A HARQ response to the HARQ process 1-A transmitted at the subframe #6 of the radio frame (i+1) may be determined as follows according to not only the result of joint decoding of the previously transmitted data A but also the presence or absence of UL scheduling. If joint decoding is successful and additional UL scheduling is carried out at a subframe #0 of the radio frame (i+2), the UL grant may be transmitted. If joint decoding is successful and additional UL scheduling is not performed at a subframe #0 of the radio frame (i+2), ACK can be transmitted. If joint decoding fails, retransmission of data A is needed, such that NACK can be transmitted. If the HARQ response is a UL grant and initial transmission of the new data is denoted by NACK, retransmission of the data A can be carried out at a subframe #0 of the radio frame (i+2) (not shown). If the HARQ response is denoted by ACK, the UE does not retransmit the data A and the buffer associated with the HARQ process 1-A is not flushed.

In HARQ period #3, it is assumed that the BS receives data B from the neighbor BS and performs joint decoding. In this case, according to the joint decoding result of data B and the presence or absence of additional UL scheduling, a HARQ response to the HARQ process 1-B transmitted at a subframe #4 of the radio frame (i+2) may be selected from among ACK, NACK, and UL grant.

Although the example of FIG. 11 assumes that a joint decoding time of data A is set to a subframe #3 of the radio frame (i+1), the same HARQ operation of FIG. 11 can also be carried out even when joint decoding is performed at a specific time of the HARQ period #2. In addition, it is assumed that self-decoding of the BS is performed after lapse of 2 msec from a UL data reception time of the BS for convenience of description and better understanding of the present invention. Although decoding is performed at a specific time from 0 msec to a time of less than 4 msec after reception of UL data, the HARQ operation of FIG. 11 can also be performed.

Figure 12:
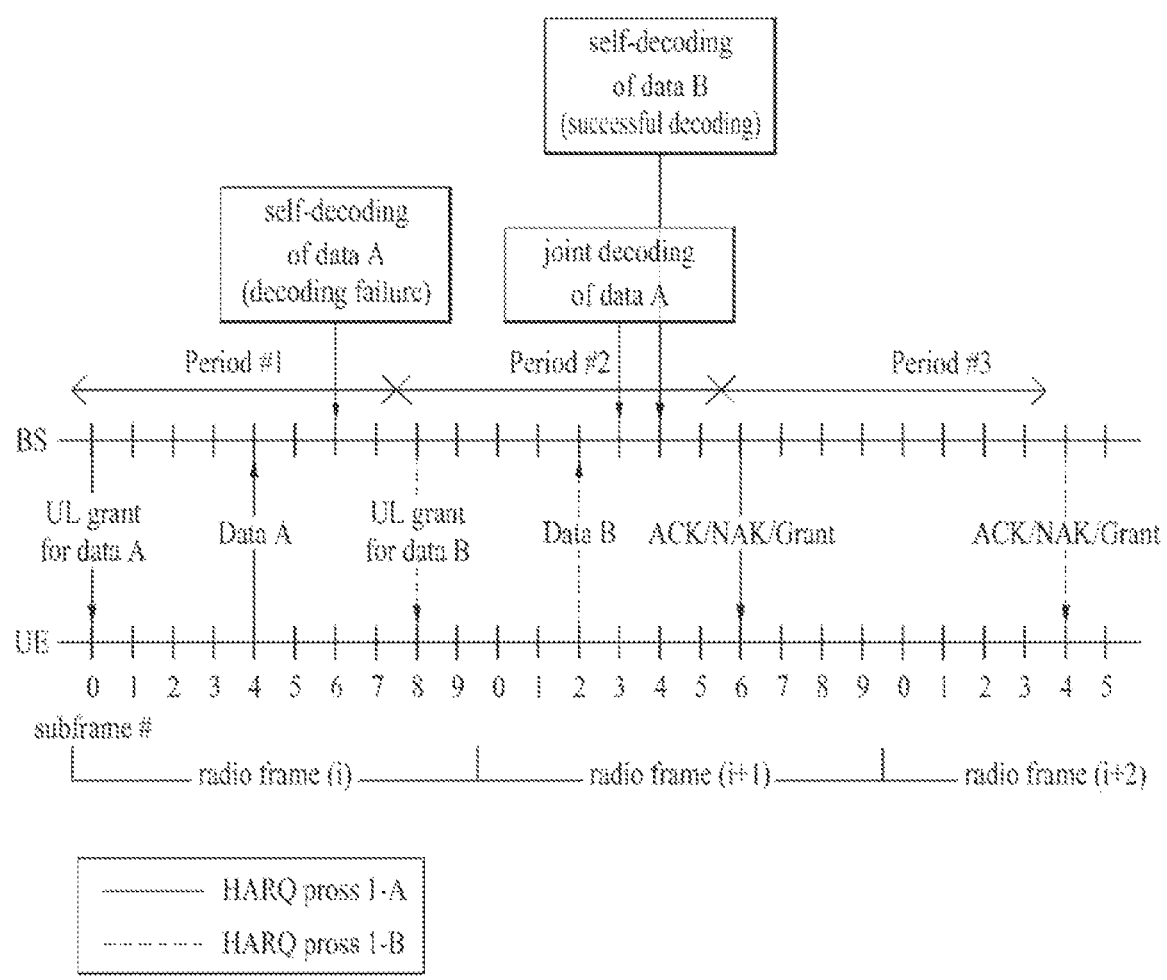
Figure 13:
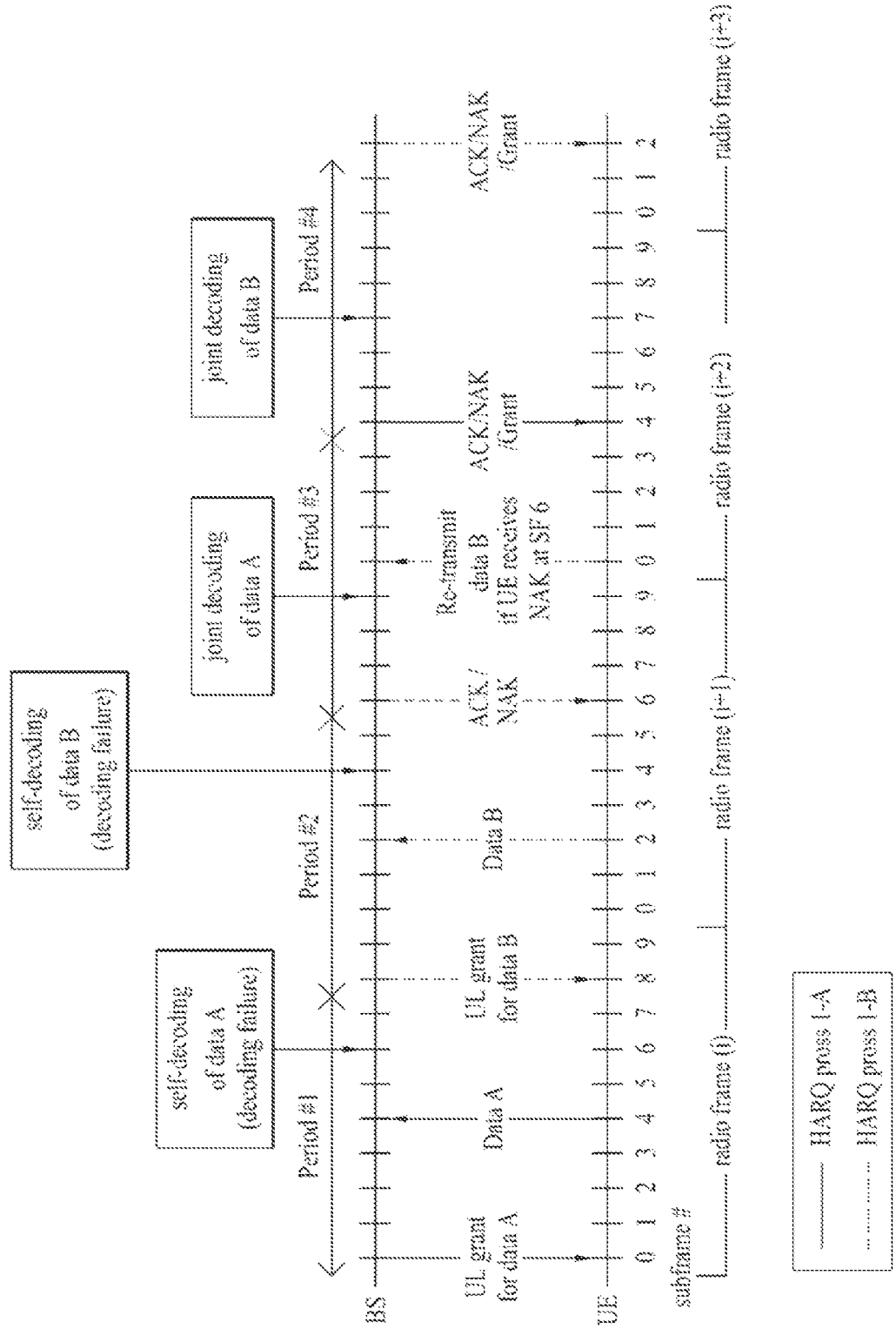
Figure 14:
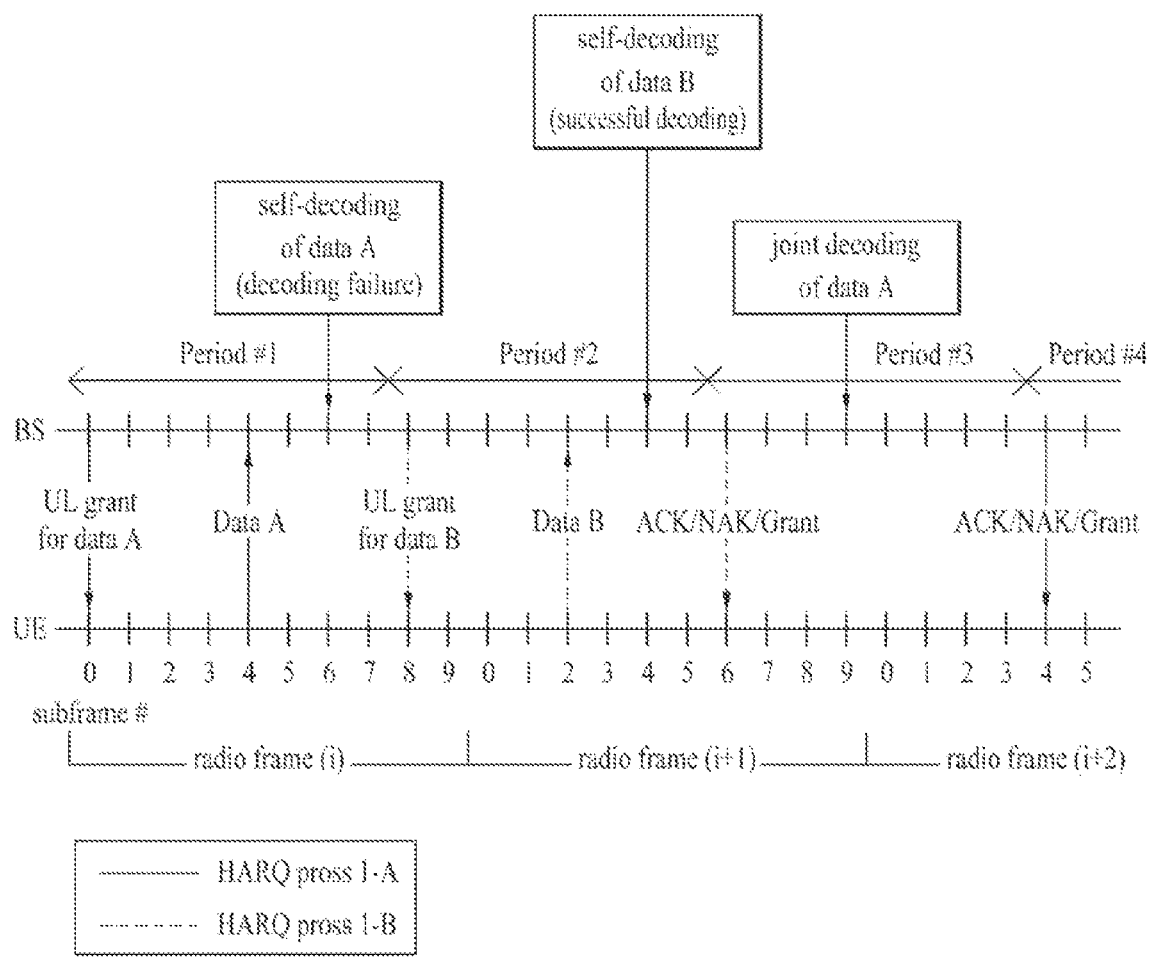

When a joint decoding time point of the BS is different from the BS joint decoding time of FIG. 11 and the self-decoding result of data B is different from that of FIG. 11, exemplary HARQ operations shown in FIGS. 12 to 14 can be performed through a double HARQ process of the present invention.

The HARQ operation from the radio frame (i+1) to the subframe #2 shown in FIG. 12 is identical to that of FIG. 11. The example of FIG. 12 assumes that joint decoding of data A is performed during the HARQ period #2 and data B is successfully self-decoded. In this case, after the BS transmits a HARQ response (ACK, NACK or UL grant) to the HARQ process 1-A at a subframe #6 of the radio frame (i+1), the BS can transmit a response to the HARQ process 1-B at a subframe #4 of the radio frame (i+2). The HARQ process to the HARQ process 1-A may be determined according to the presence or absence of UL scheduling after completion of joint-decoding of data A. If the HARQ response received by the UE at the subframe #6 of the radio frame (i+1) is denoted by a UL grant, and if initial transmission of new data is denoted by NACK, retransmission of data A can be performed at a subframe #0 of the radio frame (i+2) (not shown). If the HARQ response is denoted by ACK, the UE does not retransmit data A and does not flush the buffer associated with the HARQ process 1-A.

It is assumed that a backhaul link delay of FIGS. 13 and 14 is longer than those of FIGS. 11 and 12. It is assumed that joint decoding of data (A, B) shown in FIGS. 13 and 14 is performed during HARQ period #3 or #4.

The HARQ operation from the radio frame (i+1) to the subframe #2 in FIG. 13 is identical to that of FIG. 11. The HARQ response to the HARQ process 1-B can be transmitted at the subframe #6 of the radio frame (i+1), differently from the above-mentioned examples. Since joint decoding is not yet performed in the HARQ process 1-A, the HARQ response (i.e., ACK/NACK for data A or UL grant for new data) to the HARQ process 1-A is not appropriate. In addition, joint decoding of data B is not yet completed, such that transmission of the HARQ response to the HARQ process 1-B may not be appropriate. However, assuming that the BS does not transmit any HARQ response at the subframe #2 of the radio frame (i+1), it is more preferable that the BS transmits a HARQ response to a specific HARQ process so as to prevent ambiguity of the UE operation. ACK/NACK for one HARQ process may be transmitted in such a manner that the UE can specify at least one of the HARQ processes 1-A and 1-B. This example assumes that the HARQ response to data B (i.e., HARQ process 1-B) failed to be self-decoded is transmitted in resent times.

In this case, if the HARQ response to the HARQ process 1-B is transmitted at the subframe #6 of the radio frame (i+1), and if the HARQ response is a UL grant of new data, the UE flushes the buffer so that data B may be lost or damaged. As a result, the HARQ response may be limited to ACK or NACK. Upon receipt of NACK, the UE may retransmit data B at the subframe #0 of the radio frame (i+2). Upon receipt of ACK, the UE does not retransmit data B without flushing the buffer.

As can be seen from FIG. 13, if the BS fails to self-decode data B during the HARQ period #2, NACK is fed back at the subframe #6 of the radio frame (i+1), and retransmission of data B is performed at the subframe #0 of the radio frame (i+2).

The BS having performed joint decoding of data A during the HARQ period #3 may transmit a HARQ response (ACK/NACK or UL grant) to the HARQ process 1-A at the subframe #4 of the radio frame (i+2). The HARQ response to the HARQ process 1-A may be determined according to the presence or absence of additional UL scheduling after completion of joint decoding of data A. If the HARQ response received by the UE at the subframe #4 of the radio frame (i+2) is denoted by a UL grant, and if initial transmission of new data is denoted by NACK, retransmission of data A can be performed at a subframe #8 of the radio frame (i+2) (not shown). If the HARQ response is denoted by ACK, the UE does not retransmit data A and does not flush the buffer associated with the HARQ process 1-A.

It is assumed that the BS receives data B from the neighbor BS during the HARQ period 4 and performs joint decoding. In this case, the HARQ response to the HARQ process 1-B transmitted at the subframe #2 of the radio frame (i+3) may be selected from among ACK, NACK and UL grant according to the joint decoding result of data B and the presence or absence of additional UL scheduling.

The HARQ operation up to the subframe #2 of the radio frame (i+1) shown in FIG. 14 is identical to that of FIG. 11. The example of FIG. 14 assumes that the BS succeeds in self-decoding of data B during the HARQ period #2. In this case, ACK/NACK or UL grant to the HARQ process 1-B may be transmitted at the subframe #6 of the radio frame (i+1). Differently from the example of FIG. 13, it is not necessary to await the result of joint decoding even when data B is successfully self-decoded, so that it is more preferable that UL grant for transmission of new data be transmitted through the HARQ process 1-B. Meanwhile, joint decoding of data B is performed in the HARQ period #3, and ACK/NACK or UL grant for the HARQ process 1-A may be transmitted at the subframe #4 of the radio frame (i+2).

Method for Indicating HARQ Process

In the above-mentioned examples, if multiple HARQ processes are associated with one TTI, specific information indicating which HARQ process is associated with a HARQ response transmitted at a specific time must be decided to accurately perform the HARQ operation.

When deciding one of HARQ processes, a predetermined rule may be used without additional signaling. For example, in case of using a double HARQ process, two HARQ processes may be determined alternately. In case of using a plurality of HARQ processes, a HARQ process associated with a specific time may be decided according to the increasing order of the HARQ process index.

Alternatively, information indicating which one of HARQ processes will be used may be signaled as necessary. For example, according to the synchronous HARQ operation shown in FIGS. 11 to 14, the HARQ response time or opportunity is given at intervals of 8 msec as shown in Subframe #8 of HARQ period #2, Subframe #6 of HARQ period #3, Subframe #4 of HARQ period #4, etc. In accordance with the self-decoding result and the joint decoding execution time as shown in FIGS. 11 to 14, the BS may inform the UE of specific information indicating which one of HARQ processes 1-A and 1-B corresponds to a HARQ response transmitted at a specific HARQ response time.

For example, one additional bit (1 bit) is defined for bits indicating ACK/NACK information for a PHICH used for HACK response for use in the LTE system, such that one of two HARQ processes may be indicated. In addition, one additional bit (1 bit) is defined for a UL grant message transmitted through a UL grant DCI format (e.g., DCI format 0 or 4) in the LTE system, such that one of two HARQ processes may be indicated. Alternatively, as a method for adding HARQ process indication information simultaneously while maintaining the legacy UL grant DCI format size, one reserved bit (1 reserved bit) from among the legacy defined fields in the UL grant DCI format may be used. In addition, bit(s) for RB allocation for use in the UL grant DCI format may be given as a function indicating the number of UL RBs, and RB allocation granularity is cut in half, so that 1 bit may be subtracted from payload of RB allocation and therefore one bit (1 bit) may be used for HARQ process indication.

If three or more HARQ processes are associated with one TTI, specific information indicating which HARQ process corresponds to a HARQ process through additional bits having the size of more than 1 bit can be indicated.

Uplink 2-Codeword HARQ Operation

In accordance with the LTE-A MIMO system, a maximum of 2 codewords may be spatially multiplexed and then transmitted on uplink. A transmission (Tx) buffer may be present per codeword for implementation of 2 codewords. If spatial multiplexing is established in the LTE-A system, two HARQ processes are associated with one TTI. If no spatial multiplexing is not established, one HARQ process is associated with one TTI. In other words, only when the UE transmits two codewords within one TTI, two HARQ processes are associated with one TTI. If the UE transmits only one codeword within one TTI, only one HARQ process is associated with one TTI.

However, according to the double HARQ process proposed by the present invention, two HARQ processes may be associated with one TTI, irrespective of whether one or two codewords are transmitted within one TTI. For example, assuming that the double HARQ process according to the present invention is established for the UE, two HARQ subprocesses (e.g., HARQ processes 1-A and 1-B) may always be associated with one TTI. In this case, even when one codeword is transmitted within one TTI, the HARQ operation for different data shown in FIGS. 11 to 14 can be carried out through a separate HARQ process. Here, a first HARQ subprocess (e.g., HARQ process 1-A) may be used for a first codeword (e.g., data A), and a second HARQ subprocess (e.g., HARQ process 1-B) may be used for a second codeword (e.g., data B).

In accordance with the legacy LTE-A system, assuming that one codeword is transmitted within one TTI without spatial multiplexing, if a UL grant of new data B for one HARQ process associated with the corresponding TTI is given during the HARQ operation (i.e., transmission of data A, HARQ response, retransmission, etc.) of data A, the data A is flushed from the buffer, and transmission of new data is carried out. However, assuming that one codeword is transmitted within one TTI and a HARQ subprocess and buffer for each codeword is present, although a UL grant for new data B is given within the corresponding TTI when the HARQ operation for data A is carried out, the HARQ operation for new data B is carried out through the HARQ subprocess B, and the HARQ operation of legacy data A may be continuously performed through the HARQ sub-process A.

In the meantime, for implementation of the double HARQ process proposed by the present invention, a HARQ process for the first codeword needs to be re-defined as HARQ subprocess A, and a HARQ process for the second codeword needs to be re-defined as a HARQ subprocess B. Accordingly, a new UL grant message obtained by addition of control information indicating the use of two HARQ subprocesses may be defined.

Alternatively, legacy DCI format 4 may include control information for transmission of UL multiple codewords, and may include UL scheduling information of two codewords. In order to support the same operation as in legacy DCI format 4 and the double HARQ process operation, one additional bit (1 bit) for indicating whether a HARQ subprocess is used may be defined in DCI format 4.

It is assumed that transmission of one codeword is performed within one TTI (i.e., spatial multiplexing is not established). That is, it is assumed that the UE performs transmission and retransmission of codeword #1 through one HARQ process associated with a specific TTI. For example, if a bit value for indicating the HARQ subprocess use in the UL grant message for scheduling new codeword #2 is set to zero '0', the UE may perform operations of the legacy LTE-A system. That is, since only one HARQ process is associated with a specific TTI, the UE flushes the legacy codeword 1 from the buffer and transmits new codeword #2 upon receiving a UL grant for the new codeword #2. In the meantime, assuming that a bit value for indicating the HARQ subprocess use in the UL grant message for scheduling new codeword #2 is set to 1, the UE may perform a double HARQ process operation of the present invention. That is, two HARQ subprocesses are associated with one TTI, the HARQ operation for codeword #1 is performed in the HARQ subprocess A, and a UL grant for new codeword #2 may be interpreted as a UL grant of the HARQ subprocess B. Therefore, the UE may perform UL transmission of the UL grant of codeword #2 through the Tx buffer of the HARQ subprocess B. Meanwhile, codeword #1 may be maintained in the Tx buffer of the HARQ subprocess A.

Figure 15:
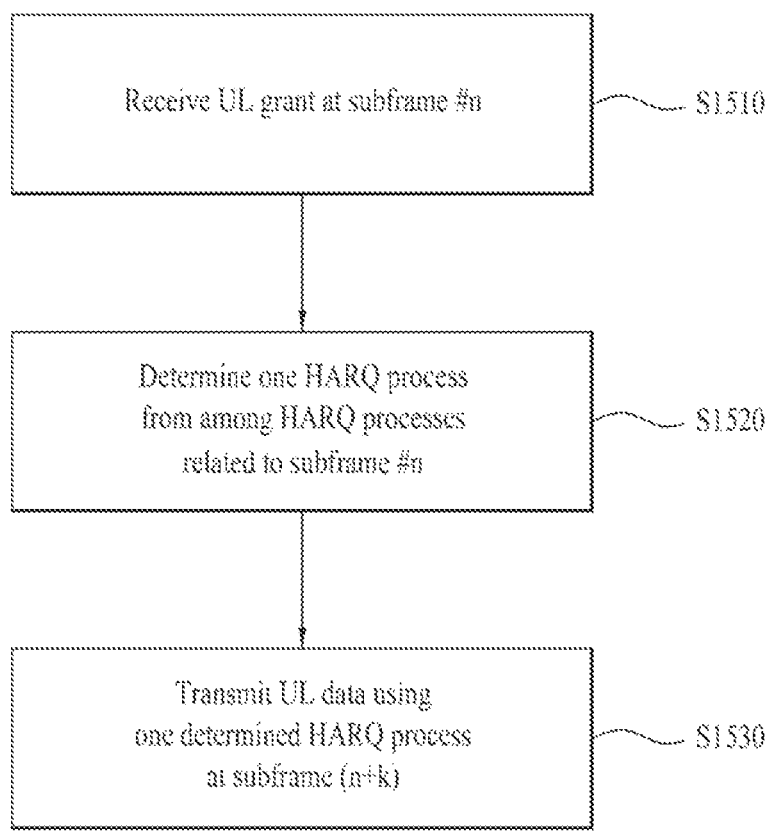
FIG. 15 is a flowchart illustrating a HARQ operation method according to one embodiment of the present invention.

FIG. 15 is a flowchart illustrating a HARQ operation method according to one embodiment of the present invention.

Referring to FIG. 15, the UE may receive a UL grant from the BS at a subframe #n in step S1510. For example, the UL grant may include scheduling information of the first UL data.

In step S1520, the UE may decide one HARQ process from among multiple HARQ processes associated with the subframe #n. In this case, differently from the legacy wireless communication system associated with only one HARQ process at a single subframe (or TTI), multiple HARQ processes are associated with one subframe (or TTI) according to the present invention, such that the operation for deciding only one HARQ process is of importance to the HARQ operation of the present invention. For example, it is assumed that the UE decides a first HARQ process from among the first HARQ process (or HARQ subprocess A) and the second HARQ process (or HARQ subprocess B) associated with the subframe #n. In this case, the operation for determining one of multiple HARQ processes may be carried out according to a predetermined rule, implicit indication, or explicit indication. For example, the UL grant received at the subframe #n may include specific information indicating the HARQ process associated with the corresponding subframe #n.

In step S1530, the UE may store UL data in the buffer of the determined HARQ process, and may transmit the corresponding UL data to the BS at a subframe (n+k). In this case, as previously shown in various examples of the present invention, k may be set to 4 (k=4).

In addition, if it is assumed that the UE transmits UL data at a subframe #p, the HARQ response (ACK/NACK or UL grant) to the UL data may be received at a subframe (p+k*d) (where is one of natural numbers corresponding to odd numbers). For example, the UE may await reception of the HARQ response to the UL data at the $4^{th}$ subframe, the $12^{th}$ subframe, . . . , the $20^{th}$ subframe after transmission of UL data.

In steps S1510 to S1530, the HARQ operation using multiple HARQ processes may be applied to the case in which the UL grant is received at a subframe. The operations of the present invention assume that multiple HARQ processes are associated with one subframe (or TTI). As described above, if multiple HARQ processes are associated with one subframe (or TTI) during the synchronous HARQ operation as described above, this means that multiple HARQ processes associated with the subframe #n are identical to multiple HARQ processes associated with the subframe (n+2k*m) (where, m is one of natural numbers).

As shown in the above-mentioned example, according to the UL grant received at the subframe #n, it is assumed that first UL data is transmitted through the first HARQ process at the subframe (n+k) and the UE awaits reception of the HARQ response to the first UL data. In this case, the UE operation of FIG. 15 may be carried out according to the same principles.

In more detail, the UE may receive a UL grant message for second UL data at the subframe (n+2k*m) (where 'm' is one of natural numbers) in step S1510. In this case, the UE may decide one HARQ process from among multiple HARQ processes associated with the subframe (n+2k*m) in step S1520.

For example, if one HARQ process decided by the UE is the first HARQ process, the UE may transmit second UL data to the BS through the first HARQ process at the subframe (n+2k*m+k) in step S1530. In this case, the first UL data is flushed from the buffer of the first HARQ process, and the second UI data may be maintained.

In another example, if one HARQ process decided by the UE is the second HARQ process, the UE may transmit the second UL data to the BS through the second HARQ process at the subframe (n+2k*m+k) in step S1530. In this case, the first UL data is maintained in the buffer of the first HARQ process, and the second UL data is maintained in the buffer of the second HARQ process.

As described above, the UE determines one of multiple HARQ processes associated with one subframe (or a subframe corresponding to a synchronous HARQ period on the basis of one subframe), and performs the HARQ operation according to the determined HARQ process.

The above-mentioned HARQ operation shown in FIG. 15 may be implemented such that above described various embodiments of the present invention may be independently applied or two or more embodiments thereof may be simultaneously applied and a repeated description is omitted for clarity.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

Industrial Applicability

The above-mentioned embodiments can be applied to various mobile communication systems.

The invention claimed is:

1. A method for performing a hybrid automatic repeat request (HARQ) operation by a user equipment (UE) in a wireless communication system, the method comprising:
receiving an uplink (UL) grant message for first UL data from a base station (BS) at a subframe n;
determining a first HARQ process from among a plurality of HARQ processes associated with the subframe n; and
transmitting the first UL data to the base station (BS) through the first HARQ process at a subframe n+k,
wherein a HARQ-ACK response for the first UL data transmitted the subframe n+k is received at the subframe n+k+k*d where 'd' is one of natural numbers corresponding to odd numbers.

2. The method according to claim 1, further comprising:
receiving a UL grant message for second UL data at the subframe n+2k*m where m is one of natural numbers; and
determining one HARQ process from among a plurality of HARQ processes associated with the subframe n+2k*m.

3. The method according to claim 2, further comprising
if the determined one HARQ process is the first HARQ process, transmitting the second UL data to the BS through the first HARQ process at a subframe n+2k*m+k.

4. The method according to claim 3, wherein the first UL data is flushed from a buffer of the first HARQ process and the second UL data is maintained.

5. The method according to claim 2, further comprising:
if the determined one HARQ process is a second HARQ process, transmitting the second UL data to the BS through the second HARQ process at a subframe n+2k*m+k.

6. The method according to claim 5, wherein the first UL data is maintained in a buffer of the first HARQ process, and the second UL data is maintained in a buffer of the second HARQ process.

7. The method according to claim 2, wherein the plurality of HARQ processes associated with the subframe n are identical to a plurality of HARQ processes associated with the subframe n+2k*m.

8. The method according to claim 1, wherein the determining is performed on the basis of HARQ process indication information contained in the UL grant message.

9. The method according to claim 8, wherein the HARQ process indication information is 1-bit information for indicating one of two HARQ processes associated with one subframe.

10. The method according to claim 1, wherein 'K' is set to 4.

11. A user equipment (UE) for performing a hybrid automatic repeat request (HARQ) operation in a wireless communication system, comprising:
a transmission (Tx) module configured to transmit an uplink signal to a base station (BS);
a reception (Rx) module configured to receive a downlink signal from the base station (BS); and
a processor configured to control the UE including the transmission (Tx) module and the reception (Rx) module,
wherein the processor is further configured to:
receive an uplink (UL) grant message for first UL data from the base station (BS) at a subframe n using the reception (Rx) module,
determine a first HARQ process from among a plurality of HARQ processes associated with the subframe n, and
transmit the first UL data to the base station (BS) through the first HARQ process at a subframe n+k using the transmission (Tx) module,
wherein a HARQ-ACK response for the first UL data transmitted the subframe n+k is received at the subframe n+k+k*d where 'd' is one of natural numbers corresponding to odd numbers.

* * * * *